United States Patent Office 3,428,118
Patented Feb. 18, 1969

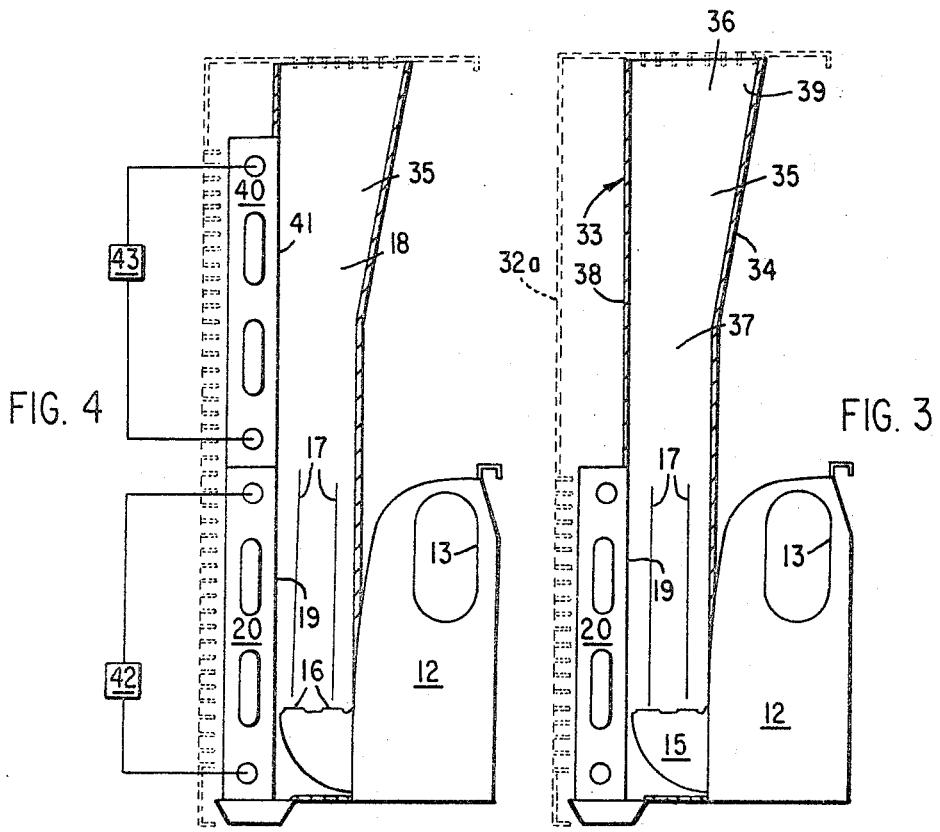
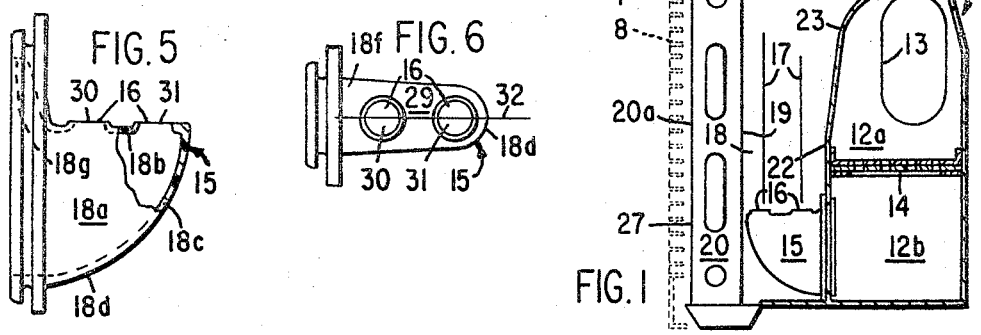
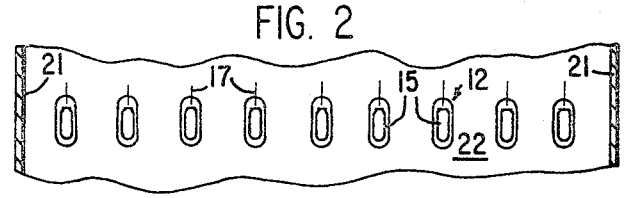

3,428,118
AIR CONDITIONING UNITS
Fred V. Honnold, Jr., North Syracuse, N.Y., assignor to Carrier Corporation, Syracuse, N.Y., a corporation of Delaware
Continuation of application Ser. No. 512,509, Dec. 10, 1965. This application Feb. 21, 1968, Ser. No. 707,174
U.S. Cl. 165—123         5 Claims
Int. Cl. F28f 13/12; F24f 3/04

ABSTRACT OF THE DISCLOSURE

An induction type room terminal provided with a passageway therethrough for a mixture of conditioned air and room air, the room air being induced therethrough by a plurality of conditioned air streams adapted to prevent flow separation from the sides of the passageway thereby increasing the efficiency of the terminal.

---

This application is a continuation of my copending application Ser. No. 512,909, filed on Dec. 10, 1965, now abandoned.

This invention relates to air conditioning units and, more particularly, to terminal induction units.

In general, induction units discharge streams of high kinetic energy primary air into a passage for inducing the flow of secondary air from a room through a heat exchange coil and into the passage to mix with the primary air. From the passage the mixture of primary and secondary air is discharged into the room. In one type of such induction units, the streams of air flow past a face of the heat exchange coil and provide a low pressure region in the passage along this coil face thus inducing secondary air through the coil. A major problem in many such induction units is that of separation of the primary and secondary air from the passage walls. Separation results in eddies and regions of stall or stagnation of air and may reverse the flow of some air along the walls, thereby reducing the capacity and efficiency of the unit.

It is a primary object of this invention to provide a new and improved air conditioning room terminal induction unit and, more particularly, such a unit in which high kinetic energy primary air flows through a passage and induces the flow of secondary air through a heat exchanger coil and substantially prevents separation of the air from along wall means of the passage. A related object is provision of such a unit having spaced apart nozzles with orifice means for discharging the primary air into the passage and increasing the induction of secondary air through substantially the entire coil by substantially preventing separation of the air along the passage wall means. Another related object is provision in such a unit of the coil positioned along the passage for the flow of the primary air along a face of the coil to induce the flow of the secondary air through the coil. Another related object is provision of such a unit having a stack portion of the passage above the coil. Still another object is provision of such a unit having a pair of coils, one above the other.

The invention is directed to an induction type room terminal base unit for an air conditioning system. A plurality of streams of high kinetic energy primary air are discharged into a passage to induce the flow of secondary air through a passage inlet to mix with the primary air, the mixture passing to a passage outlet. In the illustrated embodiments, the inlet is provided by a heat exchanger coil and the secondary air is caused to flow through substantially the entire coil. At least a portion of the primary air is directed along wall means of the passage to substantially prevent separation of the air passing along the wall means and thereby increasing the available energy of the primary air for inducing the flow of secondary air through the inlet.

These and other objects and advantages of the invention will be apparent from the following description and accompanying drawings in which:

FIGURE 1 is a schematic end view of an embodiment of an air conditioning room terminal induction type base unit, with a cabinet for the unit illustrated by dotted lines and with parts broken away for clearer illustration;

FIGURE 2 is a fragmentary front view of the unit shown in FIGURE 1, to a reduced scale and with parts broken away and removed;

FIGURE 3 is a schematic end view of another embodiment of an induction unit, with a cabinet for the unit indicated by dotted lines and with parts broken away and removed;

FIGURE 4 is a schematic end view of still another embodiment of an induction unit, with a cabinet for the unit indicated by dotted lines and with parts broken away and removed;

FIGURE 5 is an enlarged side view of a nozzle removed from any of the induction units, with a part broken away and removed; and FIGURE 6 is a top view of the nozzle illustrated in FIGURE 5.

Referring to FIGURES 1 and 2 of the drawings, an air conditioning room terminal includes a cover or cabinet 6, illustrated by dotted lines, and having a front panel 7 with an air inlet grille 8 and a top panel 9 with an air outlet grille 10. An induction type base unit 11 is housed within the cabinet 6 and includes a plenum chamber 12 having an upper chamber 12a and a lower chamber 12b with openings 13 on opposite ends of the upper chamber 12a for the passage of primary air through the upper chamber, so that a plurality of the units may be connected in a series. These chambers are separated by a damper 14 for providing a desired static pressure in the lower chamber 12b and therefore a desired flow rate of the primary air through a plurality of the horizontally aligned nozzles 15 (FIGURE 2) mounted on the plenum and communicating with the lower chamber 12b.

Each nozzle 15 has nozzle orifices 16 (FIGURES 5 and 6), each for discharging a stream or jet 17 of high energy primary air into the passage 18. Each nozzle is in the form of a hollow plastic member having two opposite, spaced, planar wall portions 18a, the contour of each wall portion being defined by a substantially straight edged portion 18b and an arcuate edge portion 18c joining the edge portion 18b. The arcuate edge portions 18c are joined by an arcuate wall portion 18d. Generally flat wall portion 18f connects the edge portions 18b and the nozzle orifices 16 are in the wall 18f. An inlet 18g is between the remaining edge portions in one end of the member adjacent the wall portion 18f and opposite the arcuate wall portion 18d for entrance of primary air from the plenum chamber into the hollow of the member. The orifices 16 may be contoured as shown in FIGURE 6 and face directly upwardly so that each stream 17 flows in a substantially vertical direction parallel to the other streams through the passage 18 and past an inner face 19 of a heat exchanger coil 20 which borders the passage 18. The coil has an outer face 20a which faces the cabinet inlet grille 8. The passage 18 is also bordered by opposed end walls 21 and a generally vertical rear wall 22 illustrated as forming a wall of the plenum in which the nozzles 15 are mounted and providing a surface generally parallel to the coil inner face 19 at the nozzles 15 with a rearwardly diverging upper portion 23 to provide a diffuser section 24 of the passage 18 which terminates in an air outlet 25 at the upper end of the passage communicating with the cabinet outlet grille 10.

The streams 17 of primary air from the nozzles 15 create a relatively low pressure, generally sub-atmospheric condition in the passage 18 adjacent the inner face 19 of the coil 20 and thereby induce air at relatively higher, generally atmospheric room pressure at the outer coil face 20a through the coil and its inner face 19 into the passage 18 to mix with the primary air, the mixture being discharged through the air outlet 25. The coil provides an air inlet 27 for the passage and this inlet extends from the lowest portion of the coil, which is substantially below the nozzle orifices 16, upwardly toward the outlet 25. Thus, during operation of the induction unit, a portion of the secondary air is induced through the coil 20 downstream of the nozzle orifices 16 and flows upwardly about the nozzles 15 and mixes with the primary air, the mixture being discharged through the outlet 25.

The orifices 16 open directly upwardly so that the axes of the streams 17 of primary air are substantially directly vertical and parallel rather than inclined to one side or the other and intersecting each other, thus avoiding detrimental interference between streams from adjacent nozzles 15 and possible production of regions of stall or stagnation resulting from decay of the streams. As shown best in FIGURES 5 and 6, each nozzle 15 has a pair of nozzle orifices 16, including a rear orifice 30 and a front orifice 31, provided in the top 29 of the nozzle. The orifices 16 of each nozzle are aligned in a row 32 (FIGURE 6) extending between the nozzle sides from the rear wall 22 of the passage 18 to the inner face 19 of the coil 20 and generally normal to the rear wall and coil inner face.

In addition to inducing the flow of secondary air through the coil 20, the rear orifices 30 provide smooth upward flow of high kinetic energy primary air along the rear wall 22 of the passage 18 in order to substantially prevent separation of the primary air and the secondary air mixing therewith as it flows across this wall to the air outlet 25.

The nozzles 15 induce secondary air flow from below the nozzle and accelerate the secondary air flow between adjacent nozzle sides and generally move the air parallel to the primary air streams 17 before mixing of this secondary air with the streams to reduce entrance losses of the secondary air induced below the nozzles. The diffuser section 24 of the passage 18 provides for pressure recovery from the sub-atmospheric pressure along the inner face 19 of the coil 20 to atmospheric pressure at the air outlet 25 and promotes mixing of the secondary air and the primary air prior to the air being discharged through the outlet.

In the embodiment illustrated in FIGURE 1, the coil 20 may have a height of about 10 inches and a spacing between the inner face 19 of the coil 20 and the rear wall 22 of the passage 18 at the nozzles 15 of about 2½ inches, and a suitable diffuser section 24 formed by the rear wall 23 generally as shown in FIGURE 1, with the nozzles 15 about 2½ inches apart center to center across the rear wall 22 (FIGURE 2) and the nozzle orifices about one-third the height of the coil inner face above the bottom of the inner face. The orifices 16 may have a diameter about $25/64$ inch with the center of the rear orifice 30 spaced about one-half inch from the rear wall 22 and the center of the front orifices 31 spaced about 1½ inches from the rear wall.

In the embodiment of FIGURE 3, a base unit is housed in a cover 32a, shown by dotted lines. A stack 33 extends above the coil 20 of FIGURES 1 and 2, and a rear wall 34 provides a surface which extends vertically from the front surface of the plenum 12 and upwardly past the top of the coil and then at about 4½ inches above the coil the rear wall diverges rearwardly at about 10 degrees to provide a diffuser section 35 extending to an air outlet 36 at the top of an air passage 37. The passage 37 is formed by the coil inner face 19 and thereabove a front wall 38 which are opposed to the rear wall 34, and by opposed end walls 39 only one of which is shown. The remaining structure is the same as that previously described. A flow rate of about 3.7 c.f.m. through each nozzle orifice will produce streams 17 of primary air having an effective height of about 18 inches and extending through a stack 33 having a length of about 12½ inches and substantially to the outlet 36 for inducing secondary air through the entire coil 20 from top to bottom. The effective secondary air inducing length of the streams 17 is a function of the orifice diameter and the stream kinetic energy which is proportional to the stream velocity at the nozzle orifice 16. The stack 33 results in better pressure recovery and mixing of the primary and secondary air streams prior to discharge from the air outlet 36. It has been found that in test units the embodiment of FIGURE 3 gives an average cooling capacity of approximately 13% to 22% more than the embodiment of FIGURES 1 and 2, depending on variable stream charactertistics.

Referring to FIGURE 4, an induction unit is illustrated having a pair of coils including the lower coil 20 as in the prior embodiments and thereabove an upper coil 40 having an inner face 41, with a total coil inner face provided by inner faces 19 and 41, respectively of the coils 20 and 40, these faces being preferably vertically aligned.

The structure of FIGURE 4 is substantially the same as that illustrated in FIGURE 3 with the exception that the front wall 38 of FIGURE 3 is replaced by the upper coil 40 of FIGURE 4, and the nozzle orifices 16 are about one-sixth the height of the total inner face above the bottom of the inner face 19 of the lower coil 20. In this embodiment, the diffuser section 35 is substantially the same as in the embodiment of FIGURE 3 and extends approximately 2½ inches above the top of the upper coil 40. The twin coil assembly of FIGURE 4 is particularly useful in a three or four pipe air conditioning system in which chilled water is passed from a refrigeration machine 42 through the lower coil 20 to provide cooling, and hot water is passed from a heating plant 43 through the upper coil 40 to provide heating. The cooling capacity of this unit with both coils 20 and 40 receiving chilled water is approximately 32% above that of the embodiment shown in FIGURE 1.

While preferred embodiments of the invention have been described and illustrated, it will be understood that the invention is not limited to these embodiments since it may be otherwise embodied within the scope of the following claims.

I claim:

1. An induction type air conditioning terminal for use in an air conditioning system comprising:

a base unit;

a cabinet for said base unit having a room air inlet grille and an air outlet grille;

said base unit including a plenum chamber;

partition means dividing said plenum chamber into an upper chamber and a lower chamber, said upper chamber being adapted for connection to a source of conditioned air;

damper means associated with said partition means for regulating the static pressure in said lower chamber;

heat exchange means disposed opposite said plenum chamber so as to form a diffuser passageway therebetween, the top portion of the passageway having a gradually increasing cross-sectional area the bottom of said heat exchange means being substantially aligned with the bottom of said plenum chamber and the bottom edge of said cabinet, said heat exchange means being coextensive with the inlet grille of said cabinet for passage of room air through the grille and said heat exchange means into the passageway;

a plurality of aligned, spaced nozzle members horizontally aligned in the lower portion of the passageway in communication with said lower chamber, said nozzle members being adapted to discharge a plurality of high kinetic energy primary air streams from said lower chamber, each of said nozzle members including first and second nozzle orifices aligned longitudinally and spaced between said heat exchange means and said plenum chamber to discharge substantially praallel streams of primary air through the passageway toward the outlet grille in said cabinet, the first nozzle orifice being substantially adjacent said heat exchange means to provide a discharge air stream parallel to the inner surface of said heat exchanger, said second nozzle orifice being spaced substantially adjacent the front surface of said plenum chamber and spaced from said first orifice to prevent substantial interference between said streams;

said nozzle members being disposed within the passageway so as to induce room air through a portion of said heat exchange means downstream from said nozzle members, the air induced through said heat exchange means downstream of said nozzle members passing between adjacent nozzle members parallel to the primary air streams.

2. A room terminal according to claim 1 wherein said heat exchange means extends substantially to the outlet grille of said cabinet, said nozzle members being positioned in the passageway so as to locate said orifices approximately one-third the distance upstream from the bottom of said heat exchange means.

3. A room terminal according to claim 1 further including a pressure recovery stack comprising a first wall associated with said heat exchange means;

a second wall opposite said first wall, associated with said plenum chamber, said first and second walls forming an extension of the passageway between said heat exchange means and said plenum chamber, said second wall having a top portion thereof diverging from said first wall so as to form a diffuser section therebetween.

4. A room terminal according to claim 3 wherein said nozzle members are positioned in the passageway so as to locate said orifices approximately one-third the distance upstream from the bottom of said heat exchange means.

5. A room terminal according to claim 3 wherein said first wall includes second heat exchange means adjacent to the top of said first heat exchange means;

said nozzle members being positioned in the passageway so as to locate said orifices approximately one-third the distance upstream from the bottom of said first heat exchange means.

References Cited

UNITED STATES PATENTS

| | | | |
|---|---|---|---|
| 2,932,956 | 4/1960 | Chieregatti | 165—123 X |
| 3,012,759 | 12/1961 | Klarer | 165—123 X |
| 3,211,218 | 10/1965 | Mehr et al. | 165—123 |
| 3,323,584 | 6/1967 | Serratto | 165—123 X |

ROBERT A. O'LEARY, *Primary Examiner.*

THEOPHIL W. STREULE, *Assistant Examiner.*